United States Patent [19]

Larose

[11] 4,437,500

[45] Mar. 20, 1984

[54] TREE CUTTING MECHANISM IN A TREE HARVESTER

[75] Inventor: Andre Larose, Macamic, Canada

[73] Assignee: Boreal Hydraulic Equipment, Macamic, Canada

[21] Appl. No.: 429,204

[22] Filed: Sep. 30, 1982

[51] Int. Cl.³ .............................................. A01G 23/08
[52] U.S. Cl. .................................. 144/34 R; 56/14.1; 83/102; 144/335
[58] Field of Search ...................... 144/3.0, 34 R, 218, 144/335, 336; 83/102, 102.1, 928; 56/14.1; 30/379, 379.5

[56] References Cited

U.S. PATENT DOCUMENTS

| | | | |
|---|---|---|---|
| 2,341,035 | 2/1944 | Grzelak | 144/34 R |
| 2,695,041 | 11/1954 | Tourneau | 144/34 R |
| 3,688,816 | 9/1972 | Runeson | 144/34 R |
| 4,090,540 | 5/1978 | Smith et al. | 144/34 R |

FOREIGN PATENT DOCUMENTS 719867  3/1980  U.S.S.R. .............................. 83/102.1

Primary Examiner—W. D. Bray
Attorney, Agent, or Firm—Jack Paavila

[57] ABSTRACT

An improved tree cutting mechanism for a tree harvester. The mechanism employs two stacked circular saws which are rotated and moved forwardly to cut through a tree. A wedge between the saws moves pieces of the tree being cut between the saws out of the way of the support for the saws.

12 Claims, 6 Drawing Figures

TREE CUTTING MECHANISM IN A TREE HARVESTER

BACKGROUND OF THE INVENTION

This invention is directed toward an improved tree cutting mechanism for a tree harvester.

The invention is also directed toward a felling head for a tree harvester incorporating the improved tree cutting mechanism.

Tree harvesters at the present time employ chain saws or shears to cut down trees being harvested. Both cutting methods have disadvantages however. Chain saws tend to bind in the cut causing breakage and thus frequent repair. In addition, frequent maintainence is required. Shears are simple in operation, do not bind and require much less maintainence than chain saws. However the cutting action of the shears often causes the tree to split or shatter from its butt end resulting in waste.

One approach being developed to overcome the problems of using chain saws or shears is to use a large circular saw on the felling head, mounted for rotation on a vertical axis. The large circular saw requires little maintainence, provides a clean cut, and binding is not a serious problem. However, the circular saw must be quite large in diameter in order to be able to cut through large trees. Due to the central mounting of the saw less than one half of its diameter is available to cut through a tree. Thus, if two foot diameter trees are to be cut, a saw close to five feet in diameter must be employed. Such a large saw requires a great deal of power, making it expensive to operate. In addition, maintainence and repair in the field is difficult because of its size. The initial cost of the saw is also high.

SUMMARY OF THE INVENTION

It is the purpose of the present invention to provide a cutting mechanism for tree harvesters which is relatively simple in construction; inexpensive to build and operate; and easy to maintain while providing a clean cut with little wood waste.

In accordance with the present invention, a cutting mechanism is provided which has a first rotary cutting device and a second rotary cutting device. The first cutting device is mounted directly above the second cutting device and is spaced a short distance therefrom. The cutting devices are circular saws and they are mounted for rotation on the top and bottom of a cutting support by a common shaft. Common drive means are provided on the support behind the saws to rotate them. Means are provided to move the support forwardly to have both saws cut transversely into a tree at vertically spaced-apart locations. Means are provided on the support between the saws to move the cut portion of the tree between the saws outwardly to provide room for the continued forward movement of the support until the tree is cut through. Since the central support for the saws can now move right through the center of the tree, nearly the entire diameter of the saws can be used to cut through the tree. Thus the size of the saws required need only be slightly larger than the diameter of the largest trees to be cut. The smaller saws mean that less power is required to operate them. Their initial cost is also less. In addition, the smaller saws are easier to service and maintain.

The invention is particularly directed toward a tree cutting mechanism for use in the felling head of a tree harvester. The mechanism has first and second rotary cutting devices with the first cutting device overlying the second cutting device and spaced a short distance therefrom. Means are provided for rotating the cutting devices and for moving the rotating cutting devices to cut through a tree. The mechanism includes means for removing the cut portion of the tree between the cutting devices in a manner to permit continued movement of the cutting devices through the tree.

The invention is also particularly directed toward a felling head incorporating the above tree cutting mechanism.

DESCRIPTION OF THE PREFERRED EMBODIMENT

Figure 1:
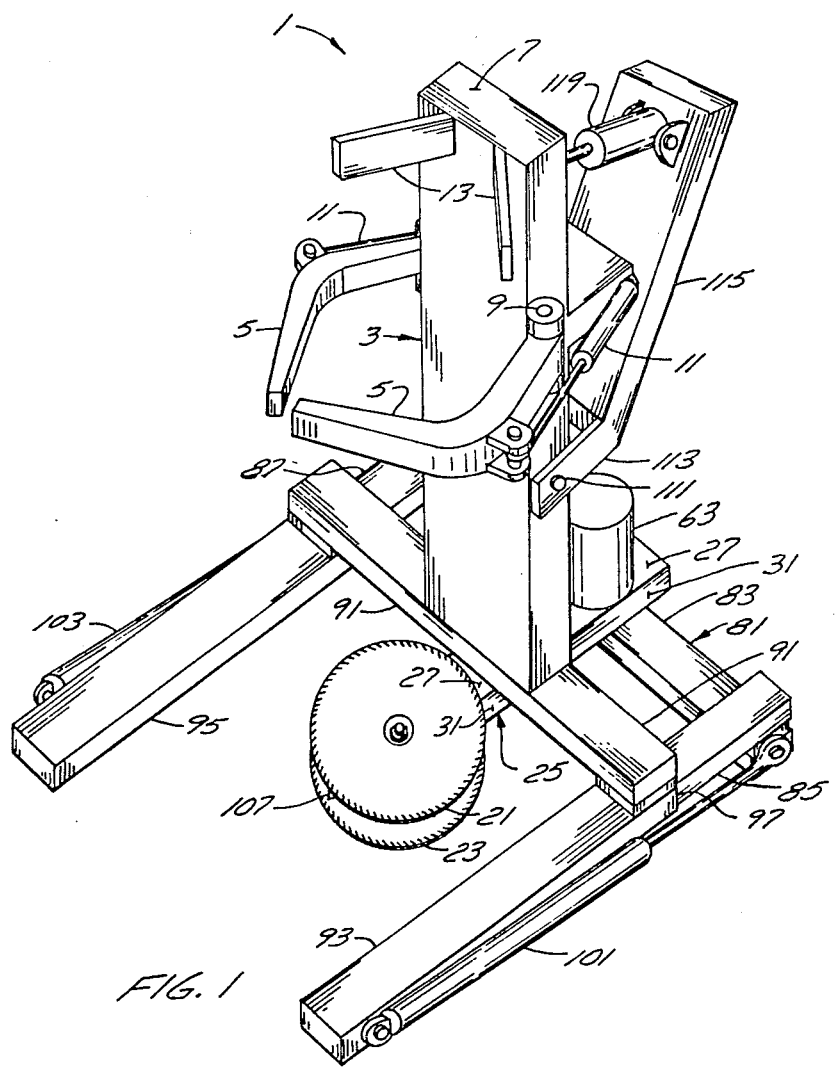
FIG. 1 is a perspective view of the felling head incorporating the improved cutting mechanism.

The felling head 1 of the present invention, as shown in FIG. 1, has upright frame 3. A pair of curved, tree-gripping arms 5 are mounted on frame 3 near its upper end 7 by vertical pivot pins 9. Hydraulic actuators 11 are pivotally connected between the arms 5 and frame 3 for moving the arms 5 generally horizontally about their pivot pins 9 to grip or release a tree to be harvested. Two locating arms 13 may be provided on the frame 3 adjacent its upper end 7. The arms 13 diverge outwardly from frame 3 and help locate the tree relative to the frame 3.

Figure 4:
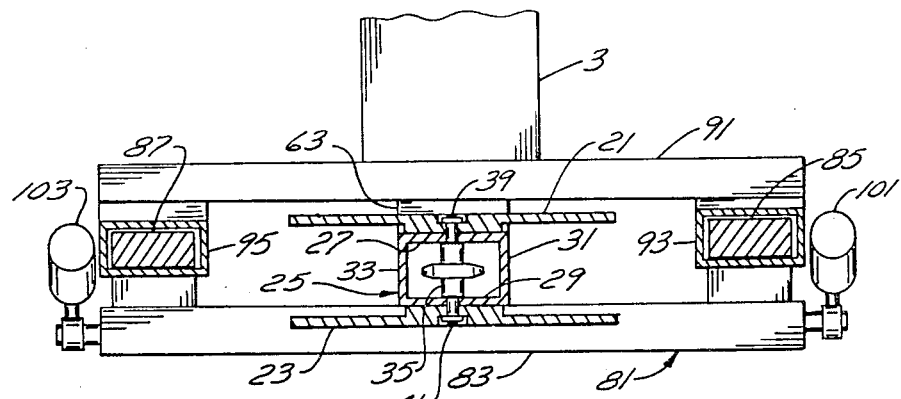
FIG. 4 is a cross-section view taken along line 4—4 of FIG. 3.
Figure 5:
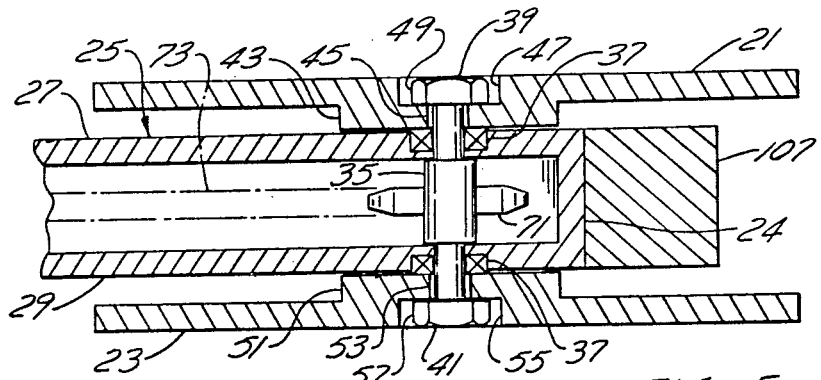
FIG. 5 is a cross-section view taken along line 5—5 of FIG. 2.

A tree cutting mechanism 15 is mounted on the bottom of frame 3. The tree cutting mechanism 15 is movable relative to the frame 3. In more detail, as shown in FIGS. 1 and 4, the tree cutting mechanism 15 of the present invention includes two rotary cutting devices 21, 23. Each cutting device 21, 23 preferably is a circular saw, the two saws 21, 23 being the same diameter. One saw 21 is mounted directly above the other 23, and spaced a short distance therefrom. The saws 21, 23 are rotatably mounted near one end 24 of an elongated support 25. The support 25 has top and bottom walls 27, 29 and side walls 31, 33. A vertical shaft 35 is rotatably mounted in the top and bottom walls 27, 29 with bearings 37 as shown in FIG. 5. The shaft 35 is located adjacent the one end of the support 25 and has threaded top and bottom projecting end portions 39, 41. The top circular saw 21 is mounted on the top end portion 39 of shaft 35. A circular, concentric flange 43 on the bottom face of saw 21 spaces the saw from the top wall 27 of support 25. The end portion 39 of shaft 35 passes through a central bore 45 in saw 21. The upper end of bore 45 is counterbored as shown at 47. A nut 49 is fastened to end portion 39 of shaft 35 in counterbore 47 to fix the saw 21 to shaft 35. The nut 49 and shaft 35 do not project above the top face of saw 21.

The bottom circular saw 23 is similarly mounted on the bottom end portion 41 of shaft 35. A circular, concentric flange 51 on the top face of saw 23 spaces the saw from the bottom wall 29 of support 25. The end portion 41 of shaft 35 passes through a central bore 53 in saw 23. The bottom end of bore 53 is counterbored as shown at 55. A nut 57 is fastened to end portion 41 of shaft 35 in counterbore 55 to fix saw 23 to shaft 35. The nut 57 and shaft 35 do not project below the bottom face of saw 23.

Figure 6:
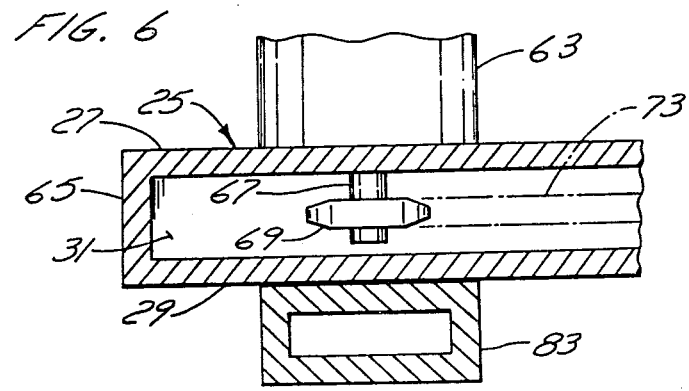
FIG. 6 is a cross-section view taken along line 6—6 of FIG. 2.

The tree cutting mechanism 15 includes means to rotate the circular saws 21, 23. The rotating means, as shown in FIGS. 4 to 6, include a drive motor 63 mounted on the support 25 near its other end 65. The shaft 67 of the drive motor 63 extends into support 25 through a hole in the top wall 27 of the support 25. The shaft 67 of drive motor 63 is parallel to the saw shaft 35. A drive sprocket 69 is mounted on drive shaft 67 and a driven sprocket 71 is mounted on saw shaft 35 within support 25. A chain 73, as shown by dotted lines, connects sprockets 69, 71 together. Operation of motor 63 will, through the chain and sprocket drive, rotate the saws 21, 23 in the same direction.

Figure 2:
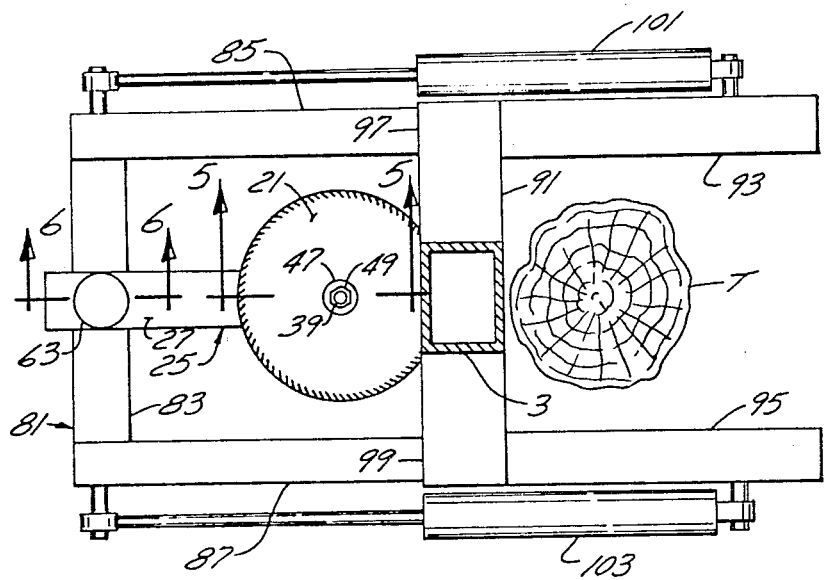
FIG. 2 is a cross-section view showing the bottom portion of the frame prior to cutting.
Figure 3:
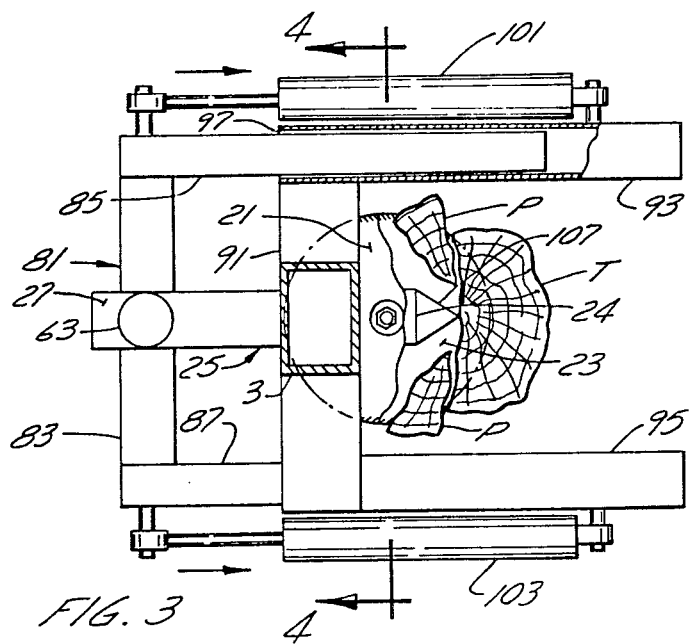
FIG. 3 is a view similar to FIG. 2 but during cutting and in partial section.

The tree cutting mechanism 15 includes means for mounting it on the bottom of frame 3 and moving the circular saws 21, 23 forwardly and rearwardly relative to frame 3. A mounting frame 81 is provided, as shown in FIGS. 2 and 3, consisting of a cross-bar 83 and two guide arms 85, 87 projecting forwardly from the ends of cross-bar 83. The guide arms 85, 87 are parallel to each other. The rear of support 25 is fixed onto the center of cross-bar 83 of frame 81 and extends forwardly therefrom, midway between arms 85, 87 and parallel to them.

The main frame 3 of the felling head 1 has a bottom transverse frame member 91 as shown in FIG. 1. A pair of guide frame members 93, 95 extend forwardly from the ends of transverse frame member 91. Guide frame members 93, 95 are parallel to each other and hollow. Their rear ends 97, 99 are open as shown in FIGS. 2 and 3 and the cross-sectional area of their hollow interior is sized to just receive the guide arms 85, 87 of the mounting frame 81 of the tree cutting mechanism 15. Hydraulic actuators 101, 103 are mounted at one end to frame members 93, 95 respectively, and at their other end to the ends of cross-bar 83 of mounting frame 81. Operation of actuators 101, 103 will move mounting frame 81 forwardly relative to main frame 3, thus moving saws 21, 23 forwardly from a position just behind main frame 3 to a position forwardly of frame 3. The saws 21, 23 pass just under main frame 3 and bottom frame member 91. In moving forward, the saws 21, 23 are rotated by drive motor 63 and cut through a tree "T" as shown in FIGS. 2 and 3, held by the gripping arms 5.

In accordance with the present invention, means are provided on the tree cutting mechanism 15 to permit the saws 21, 23 to cut completely through the tree "T". These means operate to move the portion of the cut tree between the saws 21, 23 in a manner to permit continued forward movement of the saws. The tree portion moving means comprises a wedge 107 mounted on the one end of support 25 and projecting forwardly. Preferably wedge 107 is fixed to support 25. Forward movement of support 25 and saws 21, 23 by actuators 101, 103 will cause wedge 107 to split the cut portion of the tree between saws 21, 23 into pieces "P" as shown in FIG. 3 and to move these pieces outwardly to provide space for continued forward movement of the leading end of support 25. Forward movement of the saws 21, 23 is continued until tree "T" is completely cut through.

As shown in FIG. 1, the felling head 1 is mounted by pivot means 111 to the free end 113 of a boom 115 carried by a vehicle (not shown). The pivot means 111 connect the boom 115 to the frame 3 below the gripping arms 5. A hydraulic actuator 119 can be pivotally connected between the boom 115 and frame 3 above pivot means 111 to rotate the felling head 1 about pivot means 111.

The boom 115 is operated from the vehicle to position the felling head 1 adjacent the bottom end of a tree "T" to be harvested. Once the felling head 1 is in position, the gripping arms 5 are operated to securely grip the tree "T". The drive motor 63 is then operated to actuate the saws 21, 23 and mounting frame 21 is moved forwardly by actuators 101, 103 to have the rotating saws 21, 23 cut through the tree "T". As the saws 21, 23 cut through the tree, the wedge 107 splits pieces of the cut tree portion between the saws outwardly allowing continued forward movement of the saw.

The saws 21, 23 need only be slightly larger in diameter than the diameter of the largest trees to be cut. Thus a great saving in initial saw expense, and the power needed to run the saws, is effected.

I claim:

1. A tree cutting mechanism for use in the felling head of a tree harvester, the mechanism having: first and second rotary cutting devices; the first cutting device overlying the second cutting device and spaced a short distance therefrom; means for rotating the cutting devices; means for moving said cutting devices to cut through a tree; and means for removing the cut portion of the tree between the cutting devices in a manner to permit continued movement of the cutting devices through the tree.

2. A tree cutting mechanism as claimed in claim 1 wherein the cutting mechanism includes an elongated support having oppositely disposed ends, the first cutting device mounted on the top of the support adjacent one end of the support, the other cutting device mounted on the bottom of the support adjacent the same end.

3. A tree cutting mechanism as claimed in claim 2 wherein the means for moving the cutting devices comprises means for moving the elongated support forwardly in the direction of its long dimension.

4. A tree cutting mechanism as claimed in claim 2 wherein the means for removing pieces of the cut tree comprise a wedge mounted on the support at the one end between the cutting devices.

5. A tree cutting mechanism as claimed in claim 2 wherein the means for rotating the cutting devices comprises a drive motor mounted on the elongated near its other end, and drive means connecting the drive motor to the cutting devices.

6. A tree cutting mechanism as claimed in claim 2 wherein each cutting device comprises a circular saw.

7. A felling head for use in a tree harvester comprising: a main frame; means on the main frame for gripping a tree to be harvested; first and second rotary cutting devices mounted on the main frame beneath the gripping means, the first cutting device overlying the second cutting device and spaced a short distance therefrom; means for rotating the cutting devices; means for moving said cutting devices relative to the frame to cut through a tree held by the gripping means; and means for removing the cut portion of the tree located between the cutting devices in a manner to permit continued movement of the cutting devices through the tree.

8. A felling head as claimed in claim 7 including an elongated support mounted on the frame, the first cutting device mounted on the top of the support adjacent one end of the support, the other cutting device mounted on the bottom of the support adjacent the same end.

9. A felling head as claimed in claim 8 including means for slidably mounting the support on the frame, and the means for moving the cutting devices relative to the frame comprising means for sliding the support forwardly relative to the frame.

10. A felling head as claimed in claim 9 wherein the means for removing pieces of the cut tree comprise a wedge mounted on the support at the one end between the cutting devices.

11. A felling head as claimed in claim 7 wherein each cutting device comprises a circular saw.

12. A felling head as claimed in claim 8 wherein the means for rotating the cutting devices comprises a drive motor mounted on the elongated support near its other end, and drive means connecting the drive motor to the cutting devices.

* * * * *